(12) United States Patent
Quint et al.

(10) Patent No.: US 12,347,666 B2
(45) Date of Patent: Jul. 1, 2025

(54) POSITIONING OF A NEEDLE-LIKE COMPONENT IN A MASS SPECTROMETRY SYSTEM

(71) Applicant: Roche Diagnostics Operations, Inc., Indianapolis, IN (US)

(72) Inventors: Stefan Quint, Munich (DE); Florian Schweinberger, Munich (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 853 days.

(21) Appl. No.: 17/453,189

(22) Filed: Nov. 2, 2021

(65) Prior Publication Data
US 2022/0172940 A1 Jun. 2, 2022

(30) Foreign Application Priority Data

Nov. 27, 2020 (EP) .................................. 20210212

(51) Int. Cl.
| | | |
|---|---|---|
| *H01J 49/00* | (2006.01) | |
| *G01N 30/72* | (2006.01) | |
| *H01J 49/16* | (2006.01) | |
| *G01N 30/02* | (2006.01) | |

(52) U.S. Cl.
CPC ........ *H01J 49/167* (2013.01); *G01N 30/7266* (2013.01); *H01J 49/0031* (2013.01); *G01N 2030/027* (2013.01)

(58) Field of Classification Search
CPC ...... H01J 49/167; H01J 49/0031; H01J 49/16; H01J 49/0495; H01J 49/068; G01N 30/7266; G01N 2030/027; G01N 30/02; G01N 27/62; G01N 27/626; G01N 30/72

USPC ......................................... 250/281, 282, 288
See application file for complete search history.

(56) References Cited

U.S. PATENT DOCUMENTS

| | | |
|---|---|---|
| 6,667,474 B1 | 12/2003 | Abramson et al. |
| 2014/0047905 A1 | 2/2014 | Tomany et al. |
| 2016/0079051 A1* | 3/2016 | Valaskovic ........... H01J 49/165 250/288 |

(Continued)

FOREIGN PATENT DOCUMENTS

| | | |
|---|---|---|
| CN | 105575752 A | 5/2016 |
| CN | 105632866 A | 6/2016 |
| CN | 110455972 A | 11/2019 |

(Continued)

OTHER PUBLICATIONS

European Search Report issued Apr. 22, 2021, in Application No. 20210212.5, 2 pp.

(Continued)

*Primary Examiner* — Michael Maskell
(74) *Attorney, Agent, or Firm* — Taft Stettinius & Hollister LLP

(57) ABSTRACT

A packaging for a needle-like component of a mass spectrometry (MS) system is provided. The packaging includes a receptacle configured for storing the needle-like component in a secured position inside the receptacle. The packaging further comprises an actuator configured to move the needle-like component from the secured position inside the receptacle to a mounting position in which the needle-like component projects out of the receptacle for mounting the needle-like component to the MS system.

28 Claims, 6 Drawing Sheets

(56) References Cited

U.S. PATENT DOCUMENTS

2016/0217992 A1   7/2016   O'Brien et al.

FOREIGN PATENT DOCUMENTS

| CN | 110730907 A | 1/2020 |
| CN | 110828280 A | 2/2020 |
| WO | 2000/056429 A1 | 9/2000 |
| WO | 2002/059563 A2 | 8/2002 |
| WO | 2013/132676 A1 | 9/2013 |
| WO | 2014/0197665 A2 | 12/2014 |
| WO | 2016/020678 A1 | 2/2016 |
| WO | 2018/053495 A1 | 3/2018 |
| WO | 2019/049272 A1 | 3/2019 |

OTHER PUBLICATIONS

Notice of Allowance, State Intellectual Property Office of the People's Republic of China, Chinese Patent Application No. 2021114173877, Oct. 14, 2024, 2 pages.

Second Office Action; National Intellectual Property Administration of People's Republic of China; Chinese Patent Application No. 2021114173877; Jan. 18, 2024; 13 pages.

\* cited by examiner

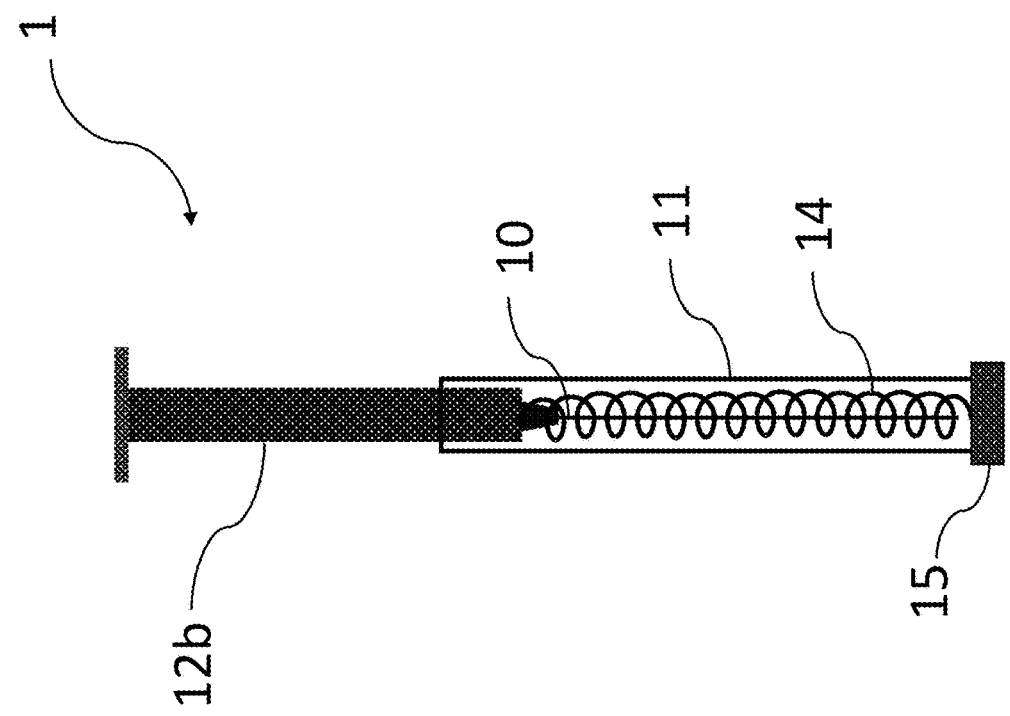
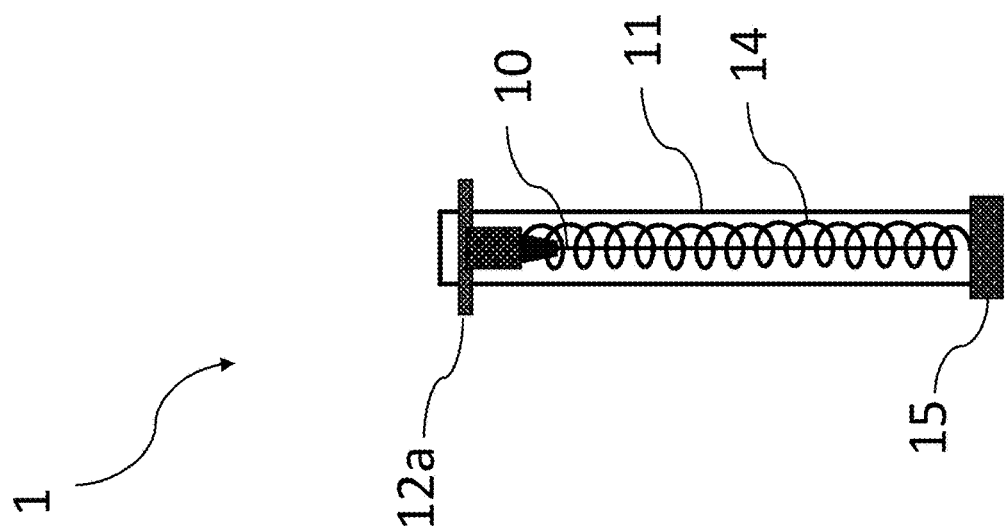
FIG. 1b
FIG. 1a

POSITIONING OF A NEEDLE-LIKE COMPONENT IN A MASS SPECTROMETRY SYSTEM

CROSS-REFERENCE TO RELATED APPLICATIONS

This application claims priority to European Patent Application No. 20210212.5, filed 27 Nov. 2020, the disclosure of which is hereby incorporated by reference in its entirety.

TECHNICAL FIELD

The present disclosure is related to a packaging for a needle-like component (e.g., an electrospray ionization capillary or sprayer needle, an atmospheric pressure photoionization capillary or an atmospheric pressure chemical ionization electrode) of a mass spectrometry (MS) system. The present disclosure is also related to mounting or removing methods for a needle-like component of an MS system.

BACKGROUND

There is growing interest for the implementation of mass spectrometry and more specifically a liquid chromatography (LC) system or a flow injection system (FIS) coupled to a mass spectrometer in the clinical laboratory as well as in other laboratory settings. Such MS systems typically comprise an ionization source to convert analyte molecules flowing from the LC system or FIS into a gaseous phase for their further analyzing in a mass spectrometer of the MS system (e.g., an MS based analyzer). The ionization source, in turn, can include a needle-like component (for example, an electrospray ionization capillary), which is a delicate and fragile element that must be replaced on a regular basis (e.g., once every three months or even more frequently in some examples) because of its gradual contamination and corrosion.

The process of replacing the needle-like component can include one or more of manually taking the component out of the box and manually inserting the component in the MS system (possibly with the help of a special tool). This is not a straightforward task and can require a certain level of skill and training due to the fragile and delicate nature of the needle-like component. As a consequence, when using some state of the art solutions a correct position of the needle-like component inside the ionization source cannot be obtained in some situations. In other situations, the needle-like component can be bent during the insertion process, which can negatively affect the overall performance of the MS system. Moreover, additional service visits may be required if this sophisticated exchange process of the needle-like component fails. In addition, there is a potential risk that a user can come into direct contact with a sharp and potentially contaminated tip of the needle-like component during the exchange process. Thus, exchanging the needle-like component is an important but at the same time tedious process that should usually be performed by a skilled service technician rather than by an inexperienced user in some existing MS devices. Therefore, there is a need in developing new efficient and simple techniques capable of solving the above-mentioned problems.

SUMMARY

In accordance with one embodiment of the present disclosure, a packaging for a needle-like component of a mass spectrometry (MS) system is provided comprising a receptacle configured for storing the needle-like component in a secured position inside the receptacle, and an actuator configured to move the needle-like component from the secured position inside the receptacle to a mounting position in which the needle-like component projects out of the receptacle for mounting the needle-like component to the MS system.

In accordance with another embodiment of the present disclosure, a method for mounting a needle-like component in a mass spectrometry (MS) system is provided comprising obtaining a packaging including the needle-like component in a secured position inside a receptacle of the packaging; and moving the needle-like component by activating an actuator of the packaging from the secured position inside the receptacle to a mounting position in which the needle-like component projects out of the receptacle to mount the needle-like component to the MS system.

In accordance with yet another embodiment of the present disclosure, a method for removing a needle-like component from a mass spectrometry (MS) system is provided, the method comprising engaging a packaging for the needle-like component with the needle-like component mounted to the MS system by activating an actuator of the packaging; and retracting the needle-like component from the mounting position into a secured position inside a receptacle of the packaging by activating the actuator of the packaging.

Although the embodiments of the present disclosure are not limited to specific advantages or functionality, the disclosure can have advantageous technical effects.

First, the techniques of the present disclosure can allow for a relatively simple and accurate introducing and positioning a needle-like component (e.g., an electrospray ionization capillary) in the MS system (e.g., inside an ion source of the MS system). Specifically, the needle-like component can be easily inserted into the ion source by means of the present packaging, which includes an actuator for effecting the insertion. In some examples, the packaging can use a principle resembling a safety syringe. In addition, if necessary, the needle-like component can also be easily removed from the ion source by using the packaging. This can reduce the risk of breaking or bending the needle-like component. The risk that a user is injured when manually handling the needle-like component is also reduced.

Second, the present technique can have the advantage that it does not involve the usage of any special sophisticated installation tools. This can make installing the needle-like components easier (e.g., for personnel having received no or little training in servicing the MS system) and/or less costly.

Third, the technique of the present disclosure can facilitate safe removal and disposal of an old and potentially contaminated needle-like component. In particular, the packaging of the present disclosure can minimize a risk of direct contact by a user with a sharp tip of the needle-like component. In addition, the packing of the present technique can provide safe transport and storage of the needle-like component, which is a delicate part in the ionization source of the MS system.

Fourth, the entire process of inserting/replacing the needle-like component using the present packaging might not require any special technical skills on the user side and can therefore potentially be performed by an inexperienced user without the need to call a skilled service technician, as is the case for some prior art MS system.

These and other features and advantages of the embodiments of the present disclosure will be more fully understood from the following detailed description taken together with the accompanying claims. It is noted that the scope of the claims is defined by the recitations therein and not by the specific discussions of features and advantages set forth in the present description.

BRIEF DESCRIPTION OF THE DRAWINGS

The following detailed description of the embodiments of the present description can be best understood when read in conjunction with the following drawings, where like structure is indicated with like reference numerals and in which:

FIGS. 1a and 1b show schematically a needle-like component of a mass spectrometry (MS) system inside a receptacle of a packaging in accordance with an embodiment of the present disclosure;

Figure 2:
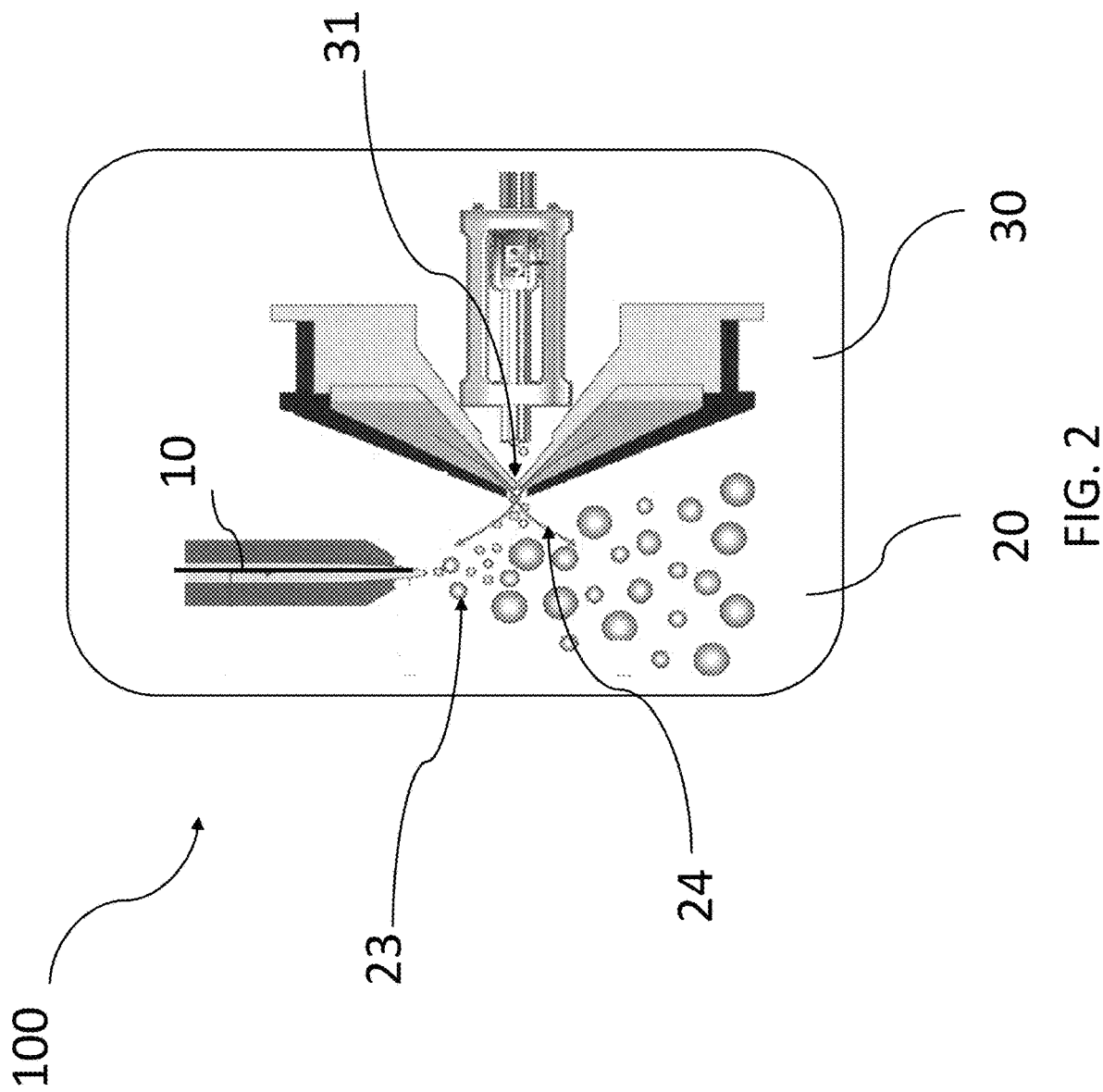
FIG. 2 illustrates schematically the MS system including an ionization source with the needle-like component forming a replaceable part of the ionization source and a mass spectrometer coupled to the ionization source in accordance with an embodiment of the present disclosure.

Skilled artisans appreciate that elements in the figures are illustrated for simplicity and clarity and have not been dawn to scale. For example, dimensions of some of the elements in the figures may be exaggerated relative to other elements to help improve understanding of the embodiment(s) of the present disclosure.

DETAILED DESCRIPTION

The terms "mass spectrometer (MS)" may refer to an analytical module comprising a mass analyzer designed to further separate and/or detect analytes based on their mass to charge ratio. In some examples, the mass spectrometer is a fast scanning mass spectrometer. However, in other examples the mass spectrometer is a tandem mass spectrometer capable of selecting parent molecular ions, generating fragments by collision-induced fragmentation, and separating the fragments or daughter ions according to their mass to charge (m/z) ratio. In still other examples, the mass spectrometer is a triple quadrupole mass spectrometer, as known in the art. Besides quadrupoles, other types of mass analyzers may be used as well, including time of flight, ion trap or combinations thereof.

The term "ionization source" as used herein refers to an interface coupling a liquid chromatography (LC) system to a mass spectrometer (LC/MS) or a flow injection system to a mass spectrometer (FIS/MS) configured to generate charged analyte molecules (molecular ions) and transferring the charged analyte molecules from a liquid into a gaseous phase. According to certain embodiments, the ionization source is an electro spray ionization (ESI) source, or a heated electrospray ionization (HESI) source, or an atmospheric pressure chemical ionization (APCI) source, or an atmospheric pressure photo ionization (APPI) or an atmospheric pressure laser ionization (APLI) source. The LC/MS or FIS/MS interface may comprise however a double ionization source, e.g., both an ESI and an APCI source, or a modular exchangeable ionization source. Typical parts of an ionization source may be a nebulizer and a sampling capillary, typically arranged orthogonally or coaxially with respect to each other. A liquid exiting the LC system or FIS is guided through a probe including a needle-like component such as a sprayer needle or capillary or an electrode depending on the particular ionization source under consideration. In this manner, the liquid is nebulized in a volume downstream of the sprayer capillary where ionization takes place and the charged analyte molecules thereby obtained are brought into a gaseous phase. A sampling device (e.g., a sampling capillary or orifice) is provided to collect the ions in the gaseous phase and guide them into the mass spectrometer.

The ionization source may further include an assembly to provide a counter gas, also known as curtain gas, (e.g., $N_2$ or zero-air, which is essentially purified, hydrocarbon free lab-air), which can shrink the droplets and reduce the entry of background ions (e.g., solvent clusters) into the MS. The assembly can have a counter plate and an orifice assembly for providing the counter gas. The ionization source may further include an assembly to provide an auxiliary gas, also known as heater gas. In order to optimize ionization conditions, it is also possible to adjust solvent composition by adding a make-up flow directly before the ionization source to adjust pH, salts, buffers or organic content. Such ionization sources are known in the art and not further elucidated here.

The term "liquid" in relation to the FIS effluent refers to samples or other analytes directly injected into the ionization source without preliminary chromatographic separation of said samples. In alternative examples, samples may be subjected to prior chromatographic separation and thus the liquid may refer to liquids commonly used in liquid chromatography (LC) techniques such as solvents or mixtures of solvents used as mobile phases or LC eluents (elution solvents), and others as known in the art.

The term "sample" refers to a biological material suspected of containing one or more analytes of interest and whose detection, qualitative and/or quantitative, may be associated to a particular condition (e.g., a clinical condition). The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents, e.g., to enable carrying out of one or more in vitro diagnostic tests, or for enriching (extracting/separating/concentrating) analytes of interest and/or removing matrix components potentially interfering with the detection of the analyte(s) of interest. Examples of analytes of interest are, i.e., vitamin D, drugs of abuse, therapeutic drugs, hormones, and metabolites in general. The list is however not exhaustive.

In some examples the ionization source, which is coupled to the MS, may be connected with the LC system or FIS via the valve-to-detector conduit. In some examples, the LC system can be configured as an analytical module designed to prepare a sample for mass spectrometry and/or to transfer a prepared sample to a mass spectrometer, in particular for separating analytes of interest before detection by a mass spectrometer. In particular, typically, during an LC run, the mass spectrometer may be set to scan a specific mass range. LC/MS data can be represented by adding up the ionized current in the individual mass scans and plotting that "total" ion current as an intensity point against time.

The term "liquid chromatography or LC" as used herein can refer to any kind of an analytical process that subjects samples injected by a sample injector to chromatographic separation through an LC column, e.g., in order to separate analytes of interest from each other and therefore to enable their individual detection, for instance, by means of a mass spectrometry detection. In other examples, said analytical process also aims at separating analytes of interest from matrix components, e.g., remaining matrix components after sample preparation that may still interfere with a subsequent detection. In some examples, such forms of liquid chromatography is used as liquid chromatography performed under pressure, e.g., "high-performance liquid chromatography" or HPLC, "ultra-high-performance liquid chromatography" or UHPLC, "micro liquid chromatography" or μLC and "small-bore liquid chromatography" or small-bore LC.

The term a "liquid chromatographic system or LC system" as used in the present disclosure is an analytical system or module or a unit in an analytical system for carrying out liquid chromatography. The LC system may be embodied as a single channel or as a multi-channel system that may comprise one or a plurality of LC columns arranged in parallel and/or in series. The LC system may also comprise elements such as a sample injector, valves, liquid sources, fluidic connections and parts, e.g., for mixing liquids, degassing liquids, tempering liquids, and the like, one or more sensors, such as pressure sensors, temperature sensors and the like, and especially at least one LC pump. The list is not exhaustive.

An "LC column" may refer to any of a column, a cartridge, a capillary and the like for performing separations of a chromatographic nature. Columns are typically packed or loaded with a stationary phase, through which a mobile phase is pumped in order to trap and/or separate and elute and/or transfer analytes of interest under selected conditions, e.g., according to their polarity or log P value, size or affinity, as generally known. This stationary phase can be particulate or beadlike or a porous monolith. However, the term "LC column" may also refer to capillaries or channels that are not packed or loaded with a stationary phase but rely on the surface area of the inner capillary wall or geometrical structures to effect separations. An example is provided by pillar array chromatography, where separation beds are formed by etching away interstitial volumes out of a solid silicon wafer, leaving an array of pillars. The resulting channels can be folded onto a small footprint by concatenating bed segments with optimized flow distributors that limit peak dispersion. This creates a stationary phase support structure that is organized in a reproducible, ordered pattern.

A composition of the mobile phase, i.e., concentrations of solvents or mixtures of solvents constituting the mobile phase and aiming at carrying a sample through the stationary phase of the LC column, may be a function that changes over time. Such a chromatographic separation process can be referred to as gradient elution. The desired time-dependence of the composition entering the LC column during the gradient elution can be programmed in advance in some examples.

The term "LC eluate" exiting an LC column is herein used to indicate a fraction of the eluate that comprises at least one analyte of interest.

The term a "fluidic stream" may refer to a fluidic path through which liquids can flow and in particular, through which a sample from a sample injection point may undergo a chromatographic process and can eventually be transferred to a mass spectrometer.

The term "MS system" refers to any combination of devices for performing mass spectrometry. For instance, a mass spectrometry system can include one or more mass spectrometers and/or one or more ionization sources as discussed above. In some examples, the MS system can include one or more LC system or FIS as discussed above.

In order that the embodiments of the present disclosure may be more readily understood, reference is made to the following examples, which are intended to illustrate the disclosure, but not limit the scope thereof.

First, a general overview over the techniques of the present disclosure will be given in connection with FIGS. 1a, 1b, 2 and 3. Then, various aspects of the techniques of the present disclosure related to a packaging for a needle-like component in a mass spectrometry (MS) system and to a method for mounting or removing the needle-like component from the MS system will subsequently be summarized in flow charts shown, respectively, in FIGS. 4 and 5. Last, some further aspects of the present disclosure will be given on the example of FIG. 6, when the MS system comprises a liquid chromatographic (LC) system.

FIGS. 1a and 1b include a schematic example of a packaging 1 for a needle-like component 10 of a mass spectrometry (MS) system 100. In one example, the MS system (e.g., an MS based analyzer) can comprise a mass spectrometer 30 (e.g., a triple quadrupole mass spectrometer) and an ionization source 20 coupled to the mass spectrometer 30 as shown in FIG. 2. In the present example, the ionization source can be an electro spray ionization (ESI) source configured to provide an ionized gas flow of a liquid (e.g., a liquid exiting a liquid chromatographic (LC) system which includes eluates of interest) towards an entrance 31 of the mass spectrometer. In the example presented in FIG. 2, the needle-like component can be an ESI capillary or sprayer needle 10, which can form a replaceable part of the ESI source 20. In some examples, the liquid guided into the ESI source can be nebulized in a volume downstream of the ESI capillary or sprayer needle 10 where ionization occurs, resulting in the production of a gaseous phase of charged molecules that constitute said liquid, also known as a nebulizer gas 23. In the example of FIG. 2, the ionization source 20 may further include an assembly configured to provide a counter gas 24 (e.g., $N_2$). Providing the counter gas 24 can shrink the droplets and reduce the amount of background ions (e.g., solvent clusters) entering into the mass spectrometer 30.

In the present techniques, the packaging can comprise a receptacle 11 configured for storing the needle-like component 10 in a secured position inside the receptacle 11. For example, the receptacle 11 can be sealed to the ambient environment (until the needle-like component is moved to the mounting position). In other examples, the receptacle 11 can include one or more openings but nevertheless shield the needle-like component 10 from the ambient environment. Returning to FIG. 1a or FIG. 1b, the receptacle in an example can include a plastic material (e.g., consist of a plastic material). The receptacle can be at least partially transparent (to allow inspecting the inside of the receptacle) or non-transparent. In other examples, the receptacle can include a glass material or other materials. The receptacle can include an opening through which the need-like element can be moved to project out of the receptacle. In some examples, the receptacle (e.g., the opening) can be closed by a cap 15 (e.g., by a screw cap) to prevent dust or dirt from penetrating and accumulating in the receptacle when the needle-like component is in the secured position inside the receptacle. The cap 15 can be configured to repeatedly close the receptacle or can be a single use cap. In one example, the closing cap can be a screw cap comprising a metallic element. In other examples, a plastic cap without screw or other means known in the art can be used to close the receptacle 11. For instance, a removable membrane can be provided to close an opening of the receptacle (e.g., the removable membrane can be removed before actuating the actuator and/or before attaching the packaging to the MS system).

In the techniques of the present disclosure, the packaging 1 can further comprise an actuator 12 configured to move the needle-like component from the secured position inside the receptacle. After being moved, the needle-like component 10 can project out of the receptacle 11 for mounting the needle-like component to the MS system (see, e.g., the embodiment presented in FIG. 3). As discussed in connection with FIG. 2 above, the needle-like component (i.e., the ESI capillary or sprayer needle 10 displayed in this figure) can be a replaceable part of the ESI source 20. In this example, the mounted position can be inside the ESI source of the MS system.

In the first example presented in FIGS. 1a, 1b, 2 and 3, the actuator 12a, 12b may be constructed as a pushbutton (e.g., an element configured to be pushed along a side-wall of the receptacle to move the needle-like component from the secured position to the mounting position). In the second example displayed in FIG. 1b, the actuator 12a, 12b can be a pushrod (e.g., an elongated element, potentially extending from an end of the receptacle, configured to be pushed to move the needle-like component from the secured position to the mounting position). In all cases, the actuator (e.g., the pushrod or the pushbutton) can be coupled to the needle-like element in the receptacle through a detachable coupling mechanism (i.e., the actuator can be detached from the needle-like element once the needle like element is in the mounting position). In one example, the actuator is configured to engage with the needle-like element through frictional force.

Figure 3:
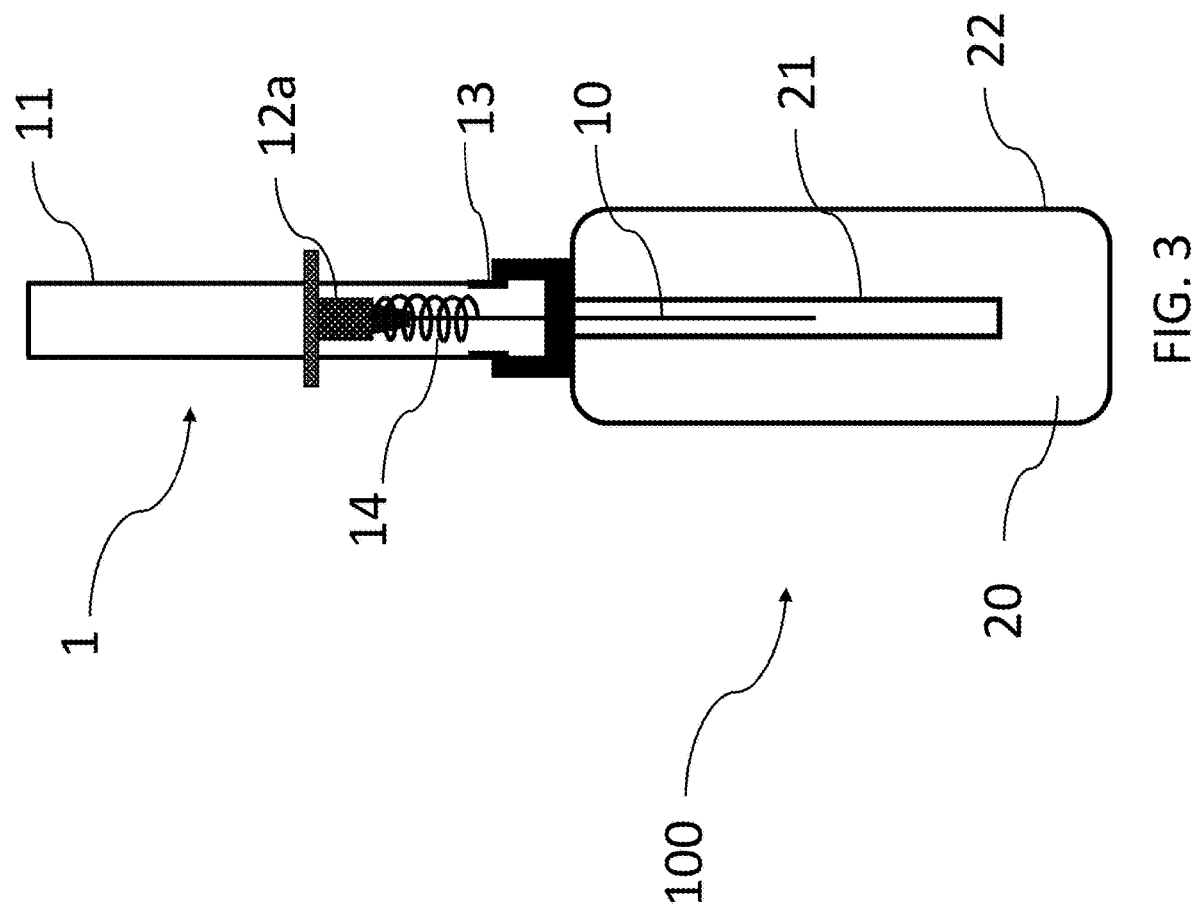
FIG. 3 shows schematically the needle-like component projected out of the receptacle for mounting the needle-like component to the mounting position in the MS system in accordance with an embodiment of the present disclosure.
Figure 4:
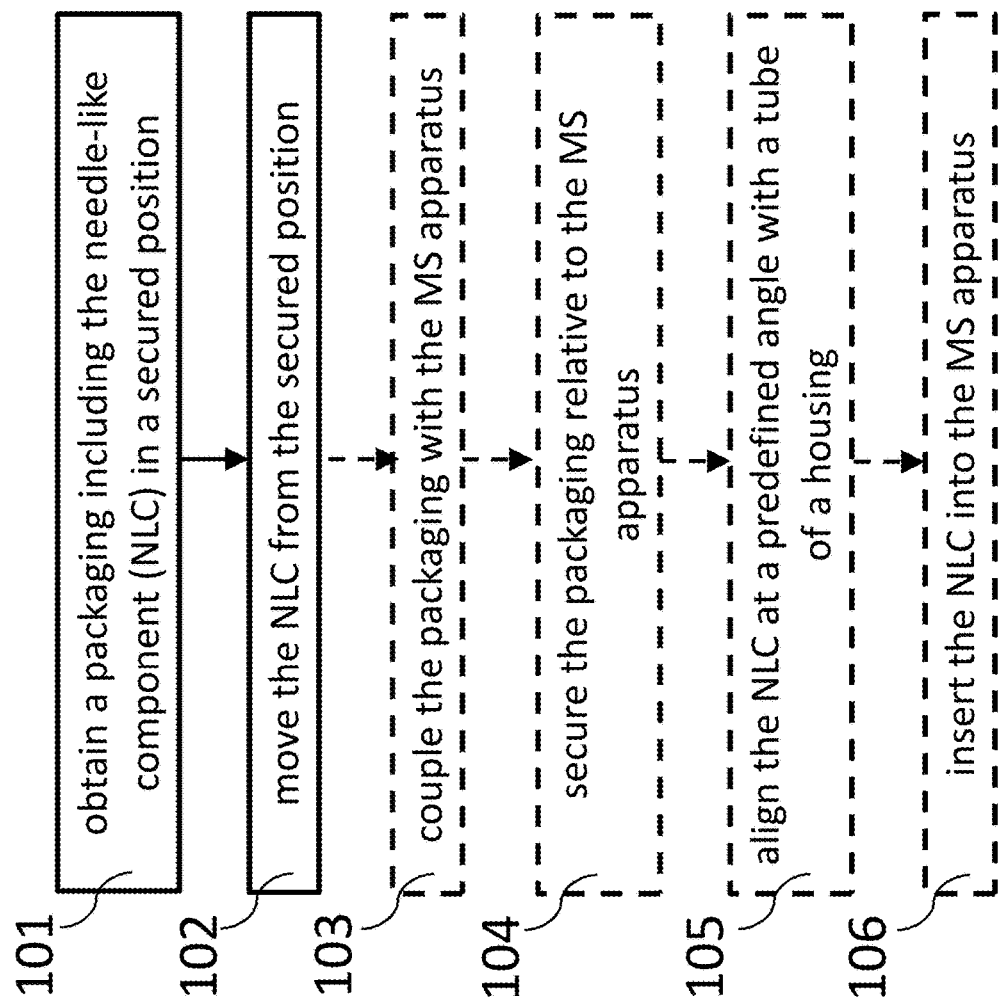
FIG. 4 is a flow diagram illustrating a packaging method for the needle-like component of the MS system in accordance with an embodiment of the present disclosure.

Further disclosed and proposed is a mounting method for a needle-like component of a mass spectrometry (MS) system schematically shown in FIG. 4 with continued reference to FIGS. 1a, 1b, 2 and 3. The method steps of the corresponding embodiment are summarized inside boxes drawn by solid lines in FIG. 4, while the method steps of optional features are shown inside boxes depicted by dashed lines. The mounting method comprises obtaining 101 a packaging including the needle-like component in a secured position inside a receptacle of the packaging. In a further step, the technique includes moving 102 the needle-like component by activating an actuator of the packaging from the secured position inside the receptacle to a mounting position in which the needle-like component projects out of the receptacle for mounting the needle-like component to the MS system.

In some examples, the needle-like component is a capillary or an electrode, optionally an electrospray ionization (ESI) capillary or sprayer needle as discussed above in connection with the embodiment shown in FIG. 2 (further examples of needle-like components will be discussed below). The packaging of the present techniques can comprise the needle-like component. In one example, the techniques include using the packaging with the needle-like component to install the latter into the MS system, for example, into the ESI source of FIGS. 2 and 3, at the stage of initially setting up a new MS system for operation. In some other examples, the packaging with the needle-like component can be used as a spare part of the MS system employed by a user when it is necessary to replace a needle-like component that is currently installed in the MS system with a replacement needle-like component. In some examples, the replacement can be performed during a scheduled maintenance of the MS system. In still other examples, the replacement has to be done in response to the detection of a malfunction in operating the needle-like component by the MS system, which can be caused, for instance, by a contamination or aging of said needle-like component. In an example, the MS system can automatically trigger a response based on the detected malfunction. In addition, the response can involve generating an alarm and/or stopping the operation of the MS system to inform a user that a needle-like element should be replaced. In some examples, before replacing the old needle-like component, a user may need to detach (e.g., unscrew) the corresponding parts of the MS system (e.g., mounting means such as a mounting nut) to access and remove the old needle-like component.

In the techniques of the present disclosure, the packaging 1 can further comprise a connector element 13 configured to couple 103 the packaging with the MS system. The connector element can be further configured to secure 104 the packaging relative to the MS system. In the secured position of the packaging relative to the MS system, the needle-like component can be aligned 105 at a predefined angle with a tube 21 (e.g., a nebulizer tube) of a housing 22 of the needle-like component of the MS system (or in alignment with another component of the MS system). In some examples, the needle-like component can be aligned in parallel with the tube 21, so that the predefined angle will be substantially zero. In other examples, the needle-like component can be aligned to form a non-zero angle of inclination with the tube 21 (for example, an inclination angle may be between 0° and 1°, between 0° and 2°, or between 0° and 5°). In some examples, securing the packaging relative to the MS system can mean securing the packaging relative to the ionization source of the MS system, e.g., relative to the ESI source as shown in the examples of FIGS. 2 and 3. In this case, the housing 22 of the needle-like component of the MS system can be a housing of the needle-like component of the ESI source. The connector element 13 of the present techniques can include a fastening element. In some examples, the fastening element can be a thread so that the packaging can be secured to the MS system by screwing the packaging to a corresponding element of the MS system. In other examples, the fastening element can be a pin or a key so that the packaging can be secured to the MS system by connecting the packaging to a corresponding recess of the MS system. In other examples, the packaging can include a recess so that the packaging can be secured to the MS system by connecting a corresponding pin or key of the MS system to the recess. In still other examples, the fastening element can be an interlock, a shaped surface or another suitable fastening element to be coupled to a respective counterpart in the MS system to couple the packaging to the MS system.

The actuator of the present disclosure can be a pusher configured to push the needle-like component from the secured position inside the receptacle into the mounting position in the MS system (see, e.g., FIG. 3). In one example, as discussed above, the pusher can be constructed as a pushbutton 12a shown in FIG. 1a. In other examples, as also discussed above, the pusher can be designed as a pushrod 12b depicted in FIG. 1b. However, the actuator can include any mechanical, electro-mechanical or other means to effect movement of the needle-like component from the secured position to the mounting position. For instance, the actuator can be configured to be actuated by pulling or rotating a respective component (e.g., a button or a handle) to move the needle-like component from the secured position into the mounting position. In these examples, the packaging can include suitable elements to translate a movement of the respective component (e.g., the button or the handle) into a translatory movement to move the needle-like component from the secured position to mounting position. In one example, the elements to translate a movement can include a gearing mechanism. In some examples, the gearing mechanism may comprise a gear wheel with discrete step sizes and an optional attached counter that is triggered by the gear wheel. Additionally, the actuator or pusher can be configured to also operate as a puller (e.g., to move the needle-like component back and forth or to remove the needle-like component from the MS system—both examples are discussed in detail below).

In the present techniques, once the packaging is secured to the MS system, the packaging is configured to facilitate inserting 106 the needle-like component into the MS system, e.g., by pushing the pusher to move the needle-like component to the mounting position in the MS system. In an example, the pusher can be activated by a user (e.g., manually) to provide pushing the needle-like component from the secured position into the mounting position. In some examples, the orientation of the needle-like component at the predefined angle with the tube 21 of the housing 22 of the needle-like component in the secured position of the packaging relative to the MS system can be the same as in the mounting position. In some examples, moving the needle-like component to the mounting position can be substantially continuous towards the mounting position. In some other examples, moving the needle-like component to the mounting position can be performed in a stepwise manner, for instance, moving can be performed in one direction towards the mounting position at different velocities for different points of time, or moving can be performed back and forth in forward and, respectively, backward directions with respect to the mounting position. In addition or alternatively, moving the needle-like component to the mounting position can be carried out by rotating the pusher around an axis parallel to the needle-like component or around an axis aligned at the predefined angle defined above (e.g., in a clockwise and/or counterclockwise manner during moving the needle-like component to the mounting position).

In the techniques of the present disclosure, the packaging 1 can comprise a resilient element 14 configured to keep the needle-like component in the secured position inside the receptacle 11. In one example, the resilient element can be a spring element 14 as illustrated in the embodiments presented in FIGS. 1a and 1b. In other examples, a resilient sleeve, tube or other resilient means can be used as the resilient element for keeping the needle-like component in the secured position inside the receptacle. In some examples, the resilient element can extend between the pusher 12a, 12b and end of the receptacle closed by the closing cap 15 or other means for closing an opening of the receptacle (e.g., the resilient means can be supported and/or fastened at the end of the receptacle closed by the closing cap 15). In some other examples, the resilient element can be shorter than the distance between the pusher and the closing cap (for instance, 5%, 10% or 20% shorter). In addition, the resilient element 14 can surround the needle-like element in the secured position such that the latter can be positioned inside the resilient element.

In some examples, the packaging 1 can comprise an indicator configured to indicate one or more states of the needle-like components (e.g., one or more positions of the needle-like component before and/or during the placement process). The indicator can indicate the states in various ways (e.g., by presenting a color, a symbol and/or a textual information or a sound). For instance, the indicator may indicate a first state when the needle-like component 10 is in the secured position inside the receptacle 11. For example, the indicator can light up in a predetermined color (e.g., red) when the needle-like component 10 is in the secured position inside the receptacle 11. In other examples, the indicator can be a movable mechanical element that presents a predetermined color (e.g., red) when the needle-like component 10 is in the secured position inside the receptacle. The fact that the needle-like component is in the secured position may be determined, for example, based on a measured force exerted by the resilient element 14 or by a position detection component.

In some examples, the packaging 1 can be configured to provide a first resistance against the movement of the actuator 12a; 12b when the actuator is moved to insert the needle-like component 10 into the MS system 100. In this case, a user can experience the first resistance when inserting the needle-like component into the MS system (e.g., over 80% or more of a translatory movement from the secured to position to the mounting position). In some examples, this may mean that a velocity at which the needle-like element is inserted by the user into the mounting position in the MS system can be limited or can be reduced by the first resistance (e.g., compared to a situation where the first resistance is not present). The first resistance against the movement of the actuator can be provided by a resilient element 14. In one example, the resilient element that can provide the first resistance may differ from the resilient element that can keep the needle-like component in the secured position inside the receptacle. In other examples, the same resilient element can provide the first resistance against the movement of the actuator and can keep the needle-like component in the secured position inside the receptacle. In some examples, the resilient element providing the first resistance can be a spring element, a resilient sleeve, tube or other resilient means known in the art. In some examples, the packaging 1 can comprise the indicator mentioned above that may indicate a second state when the needle-like component 10 is inserted into the MS system. For example, the indicator can light up in a predetermined color (e.g., orange) when the needle-like component 10 is inserted into the MS system. In other examples, the movable mechanical element can present a predetermined color (e.g., orange) when the needle-like component 10 is inserted into the MS system. The fact that the needle-like component is inserted into the MS system may be determined, for example, based on the first resistance provided by the resilient element 14 or by a position detection component.

The packaging and/or the needle-like component of the present disclosure can be further configured to provide a second resistance against the movement of the actuator when the needle-like component is registered in the mounting position. The second resistance can be larger than the first resistance against the movement of the actuator mentioned above. In some examples, the actuator cannot be moved beyond a point when the needle-like component is registered in the mounting position. In one example, the second resistance can be provided by a blocking element of the packaging. In addition or alternatively, the second resistance can be provided by a blocking element of the needle-like component. In one example, the blocking element can be a ferrule of the needle-like element. In other examples, the blocking element can be a prevention pin or other blocking element of the packaging or the MS system. In some examples, when a user reaches the second resistance, she or he can conclude that the needle-like element is well positioned and has reached the mounting position in the MS system. The packaging without the needle-like component can be then decoupled from the MS system. In an example, the user can finally fix the needle-like component in the MS system using mounting means (for example, a mounting nut).

Alternatively to using the resilient element configured to keep the needle-like component in the secured position inside the receptacle discussed above, the packaging 1 of the present disclosure can include a thread configured to allow turning of an outer part of the packaging with respect to an inner part of the packaging. In this case, the inner part of the packaging can be configured to keep the needle-like component in the secured position inside the receptacle.

Figure 5:
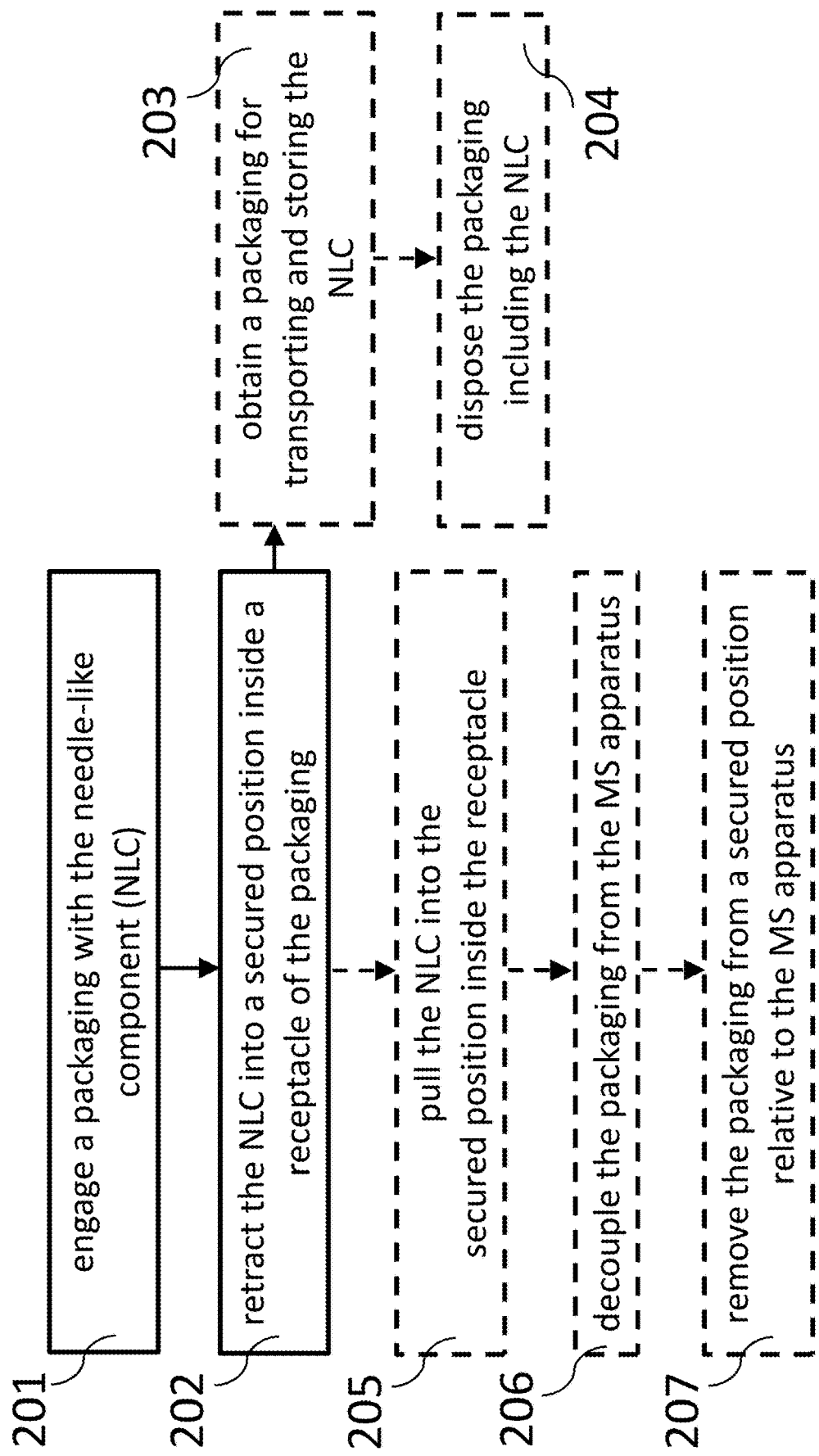
FIG. 5 is a flow diagram illustrating a method for removing the needle-like component from the MS system in accordance with an embodiment of the present disclosure.

Further disclosed and proposed is a method for removing a needle-like component from a mass spectrometry (MS) system shown in FIG. 5 with continued reference to FIGS. 1a, 1b, 2, 3 and 6. The method steps of the corresponding embodiment are summarized inside boxes marked by solid lines in FIG. 5, while the method steps of optional features are shown inside boxes depicted by dashed lines. The method for removing a needle-like component comprises engaging 201 a packaging for the needle-like component with the needle-like component mounted to the MS system by activating an actuator of the packaging. The techniques of the present disclosure further comprise retracting 202 the needle-like component from the mounting position into a secured position inside a receptacle of the packaging by activating the actuator of the packaging.

In some examples, the engaging and retracting steps can be performed with respect to the old needle-like component when it is removed from the MS system. In some examples, the packaging described above may be used for this purpose, which includes the resilient element 14 to keep the needle-like component in the secured position inside the receptacle. In other examples, where the thread is used instead of the resilient element for keeping the needle-like component, the packaging can include an additional coupling mechanism. In this case, the additional coupling mechanism (e.g., a pin or thread) and the thread can be configured to provide engaging with the needle-like component being in the mounting position and retracting the needle-like component from the mounting position into the secured position inside the receptacle. In some examples, using the thread and the additional coupling mechanism can facilitate the safe removal of the old capillary from the MS.

The retracting step of the present disclosure can comprise obtaining 203 a packaging as defined in the present disclosure (e.g., a packaging without an included needle-like component). The present techniques can ensure safe storage of the needle-like component (e.g., the old or a new needle-like component) during its transport. Specifically, the engaging and retracting steps of the present techniques can be carried out such that the user may avoid direct contact with a sharp tip of the needle-like component, which can potentially be contaminated with infectious or otherwise dangerous material (if it is removed from the MS system). The present techniques can further comprise disposing 204 the packaging including the needle-like component in the secured position inside the receptacle of the packaging. For instance, the packaging can be disposed of together with the old needle-like component retracted into the secured position inside the receptacle.

The retracting step of the present technique can further include pulling the needle-like component from the mounting position in the MS system into the secured position inside the receptacle. In general, pulling the needle-like component can be carried out when the packaging is coupled with the MS system. In some examples, the pulling step can be performed by the same actuator (such as, e.g., a pusher, pushrod, pushbutton, rotary rod, etc., disclosed above) that is used for moving the needle-like component (for example, the new needle-like component) to the mounting position in the MS system. Thus, all previous examples regarding the movement of the needle-like component to the mounting position (e.g., continuous or stepwise movement) may also be applicable to the reverse case, when the needle-like component is pulled out of the MS system. In addition or alternatively, the actuator of the present disclosure can comprise additional pushing/pulling means listed above to facilitate pulling the needle-like component from the mounting position in the MS system. For example, additional pushing/pulling means may comprise a clamp-like mechanism.

The retracting step of the present disclosure can include decoupling 206 the packaging from the MS system. In some examples, decoupling the packaging from the MS system can include decoupling the packaging from a respective counterpart in the MS system. The respective counterpart in this context may be the counterpart to which the packaging 1 can be coupled by the connector 13 in accordance with the above discussions with respect to the second general aspect, when the packaging is coupled with the MS system. Thus, in some examples, decoupling the packaging from the MS system can involve releasing/disconnecting the connector 13 (e.g., thread, pin, interlock, key, shaped surface, or another suitable fastening element as discussed above) from the respective counterpart in the MS system. The decoupling step of the present disclosure can finally include removing 207 the packaging from a secured position relative to the MS system.

In the examples above, the mounting of an electrospray ionization (ESI) capillary or sprayer needle has been discussed in more detail. However, as also discussed above, the needle-like component can be any needle-like component employed in a MS system, e.g., any capillary or needle-like electrode. In some examples, the need-like component extends generally in one direction. The need-like component can have an outer diameter of below 2 mm (e.g., below 1 mm) over an extension of at least 1 cm (e.g., at least 2 cm).

In the present techniques, the needle-like component can be configured to be mounted to an ionization source 20 of the MS system. For instance, in one example discussed in detail above in connection with the embodiment of FIG. 2, the ionization source may be an electrospray ionization (ESI) source, in which case the needle-like component can be an ESI capillary or sprayer needle. In some other examples, the ionization source can be an atmospheric pressure photoionization (APPI) source. In this case, the needle-like component can be an APPI capillary. In still other examples, the ionization source can be an atmospheric pressure chemical ionization (APCI) source. In these examples, an APCI electrode can be used as the needle-like component.

In some examples, the movement of the needle-like component can happen automatically by using suitable means. In this case, the packaging and the actuator can be configured to provide an interface to a motor or an interface to receive a control signal (to affect the actuation). In other examples, the actuator can be configured to allow both automated and manual (e.g., by the user) actuation. In some examples, one or more magnetic elements can be used in the packaging or in the MS system to define positions of the needle-like component with respect to the MS system or/and with respect to the packaging. In some examples, the actuator of the present disclosure can be an electro-mechanically operable actuator (e.g., an actuator configured to translate an electrical signal into a movement of the needle-like component). The electro-mechanically operated actuator can include a motor which can be part of the packaging or not (e.g., the actuator of the packaging can be configured to be coupled to a motor). In other examples, the actuator can include a magnetic element configured to translate the needle-like component.

In some examples, the electro-mechanically operable actuator can be controlled by a measurement signal. The measurement signal may be based on an ionization current of the ionization source. For example, the ionization current can be a function of a distance between the needle-like component and a counter plate of the ionization source. Thus, by measuring the ionization current it might be possible to accurately determine said distance between the needle-like component and a counter plate. In some examples, the automated actuation can be carried out right after manual insertion of the needle-like component by a user in order to accurately achieve the mounting position of the needle-like component in the MS system. In one example, having accomplished the manual insertion of the needle-like component 10, the user may receive an indication from the packaging (e.g., the above mentioned indicator may indicate that the needle-like component is still in the second state) that the mounting position of the needle-like component has not been fully reached (i.e., the position of the needle-like component is not sufficiently accurate in the MS system). In one example, such an inaccuracy of the position of the needle-like component may be determined based on a measured force exerted by the resilient element 14 of the packaging 1. In other examples, said position inaccuracy may be determined based on said measured ionization current. In some examples, the above mentioned automated actuation can be carried out in such a way that the position of the needle-like component in the MS system is corrected and the mounting position in the MS system is reached. In some examples, the aforementioned indicator of the packaging 1 may indicate a third state when the mounting position has been accurately reached and the needle-like element is well positioned inside the MS system. For example, the indicator can light up in a predetermined color (e.g., green) when the needle-like element is well positioned inside the MS system. In other examples, a movable mechanical element can present a predetermined color (e.g., green) when the needle-like element is well positioned inside the MS system. In this case, the actuator can be detached from the needle-like element and the packaging without the needle-like component may be decoupled from the MS system. In some examples, the fact that the mounting position is accurate may be determined based on the measured force exerted by the resilient element 14 of the packaging 1 (e.g., based on the second resistance discussed above). In other examples, the accuracy of the mounting position may be determined based on said measured ionization current. In some examples, the indicator of the packaging can provide indications similar to those described above in the reverse case, when the needle-like component is removed from the MS system.

In one example, the ionization source of the MS system can be connected to a liquid chromatographic (LC) system 40 of the MS system configured to inject a liquid flowing out of the LC system into the ionization source. In some examples, the liquid exiting the LC system can include a sample or several samples of interest, liquid chromatographic eluates, etc., which can be guided into the ESI source. Alternatively, the MS system can be connected to a flow injection (FIS) system of the MS system configured to inject the liquid flowing out of the FIS system into the ionization source. In an example, samples or other analytes of the FIS system can be directly injected into the ionization source without preliminary chromatographic separation of said samples.

Figure 6:
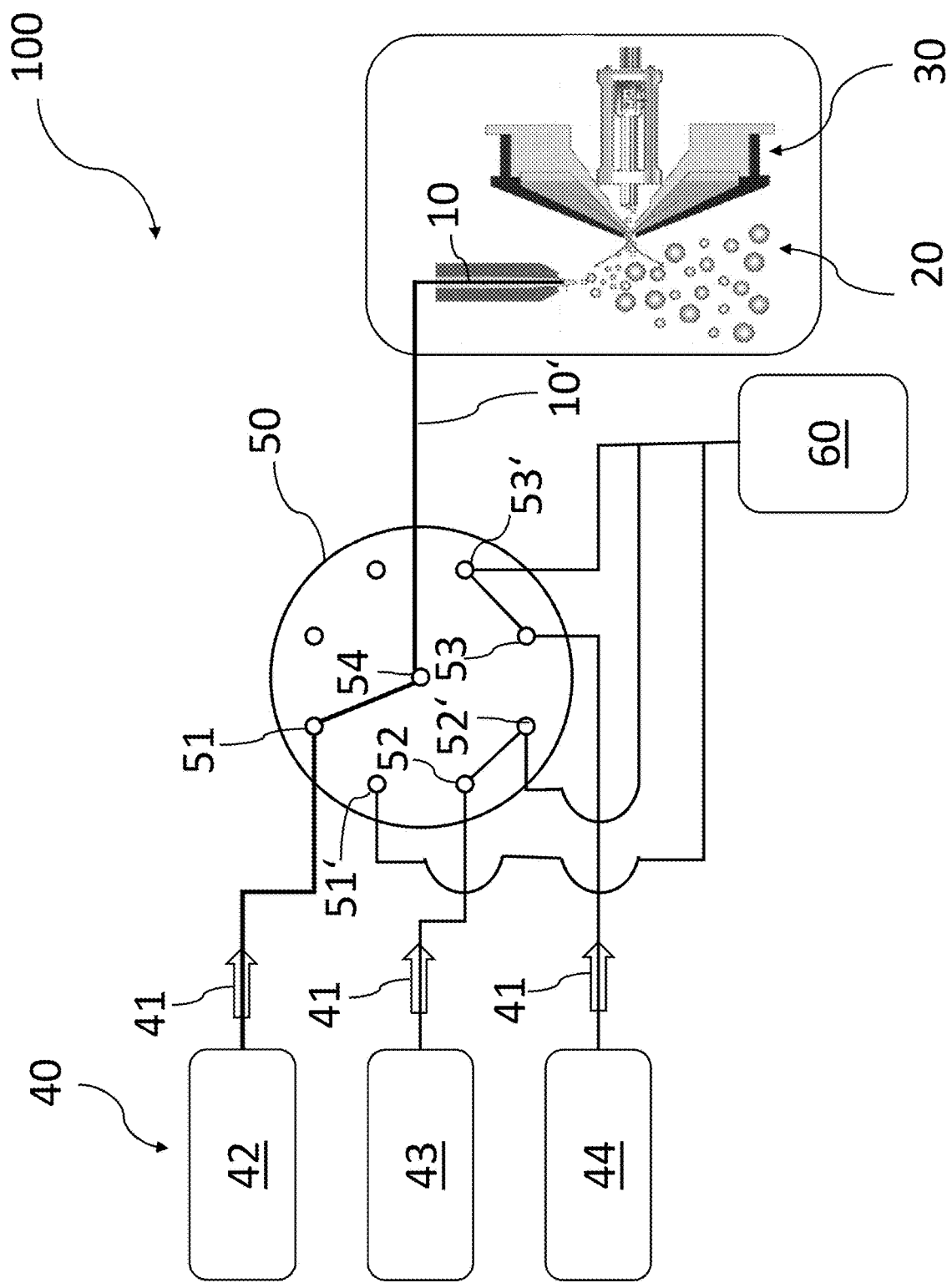
FIG. 6 shows schematically an MS system comprising a liquid chromatography (LC) system, where the LC system is connected to the electrospray ionization (ESI) source in accordance with an embodiment of the present disclosure.

FIG. 6 illustrates a schematic example of an ionization source 20 of an MS system 100, which is connected to a liquid chromatographic (LC) system 40. In some examples, the packaging for the needle-like component of the present disclosure can be used in such an MS system in the context described in detail above. In the lower right corner of FIG. 6 a mass spectrometer 30 and the ionization source 20 are shown, which are introduced above in connection with FIG. 2. In one example, the LC system can comprise multiple fluidic streams 42, 43, 44 (e.g., two or more or three or more fluidic streams) alternately connectable to the ionization source 20, so that each fluidic stream is connected to the ionization source 20 during a predefined time window. In the example shown in FIG. 6, the LC system 40 can further comprise a stream-selection valve 50 (e.g., a rotary valve) and a valve-to-detector conduit 10' configured to alternatively connect the multiple fluidic streams 42, 43, 44 via the stream-selection valve 50 to let LC eluates flow through the valve-to-detector conduit 10' to the ionization source 20. The MS system can also include different arrangements for connecting the multiple fluidic streams 42, 43, 44 to the ionization source 20. For example, the MS system can include other stream selection elements than a (rotary) valve.

In addition or alternatively, the MS system of FIG. 6 can include multiple stream selection elements (e.g., stream selection valves). In addition, the LC system can include multiple groups of fluidic streams each including two or more fluidic streams connectable to the ESI source. In the example depicted in FIG. 6, the stream-selection valve 50 comprises a plurality of fluidic-stream ports 51, 52, 53 configured to alternatively connect a respective fluidic stream from the multiple fluidic streams 42, 43, 44 of the LC system with the valve-to-detector conduit 10' in order to provide LC eluates 41 flowing from the respective fluidic stream to be inputted into the ionization source. The liquid incoming into the ionization source from the LC system can thus be nebulized in a volume downstream of the ESI capillary or sprayer needle 10 where ionization occurs, resulting in the production of a gaseous phase of charged analyte molecules (see FIG. 6, lower right corner). In the example, the stream-selection valve 50 can comprise in addition a plurality of waste ports 51', 52', 53' for each fluidic stream 42, 43, 44 from the multiple fluidic streams that lead to a waste 60. In the present example, the ionization source 20 comprises the ESI capillary or sprayer needle 10, which in some examples can form part of the valve-to-detector conduit 50, so that the mass spectrometer is connected to the valve-to-detector conduit 10' via the ionization source 20. In other examples, the sprayer capillary may not necessarily be part of the valve-to-detector conduit 10' and can be connected to it in a manner known in the art. It is understood that the embodiment presented FIG. 6 is only an example and the number of ports and connections may be adapted in many different ways and, in particular, according to the number of fluidic streams.

A number of aspects of the techniques related to a packaging for a needle-like component (e.g., an electrospray ionization capillary or sprayer needle, an atmospheric pressure photoionization capillary or an atmospheric pressure chemical ionization electrode) of a mass spectrometry system have been discussed in the preceding sections. In addition, the techniques of the present disclosure can also be carried out according to the following aspects:

Aspect 1. A packaging for a needle-like component of a mass spectrometry (MS) system, comprising:
a receptacle configured for storing the needle-like component in a secured position inside the receptacle;
an actuator configured to move the needle-like component from the secured position inside the receptacle to a mounting position in which the needle-like component projects out of the receptacle for mounting the needle-like component to the MS system.

Aspect 2. The packaging of aspect 1, wherein the needle-like component is a capillary, a sprayer needle, or an electrode, optionally an electrospray ionization (ESI) capillary.

Aspect 3. The packaging of aspect 1 or 2, further comprising the needle-like component.

Aspect 4. The packaging of any one of aspects 1 to 3, wherein the packaging further comprises a connector element configured to couple the packaging with the MS system.

Aspect 5. The packaging of aspect 4, wherein the connector element is configured to secure the packaging relative to the MS system.

Aspect 6. The packaging of aspect 5, wherein in a secured position of the packaging relative to the MS system the needle-like component is aligned at a predefined angle with a tube of a housing of the needle-like component of the MS system.

Aspect 7. The packaging of any one of aspects 4 to 6, wherein the connector element includes a fastening element, optionally a thread, a pin, an interlock, a key, a shaped surface or another suitable fastening element to be coupled to a respective counterpart in the MS system to couple the packaging with the MS system.

Aspect 8. The packaging of any one of aspects 1 to 7, wherein the actuator is a pusher configured to push the needle-like component from the secured position inside the receptacle to the mounting position.

Aspect 9. The packaging of aspect 8, wherein once the packaging is secured to the MS system, the packaging is configured to facilitate inserting the needle-like component into the MS system by pushing the pusher to move the needle-like component to the mounting position.

Aspect 10. The packaging of any one of aspects 1 to 9, wherein the packaging includes a resilient element, optionally a spring element, configured to keep the needle-like component in the secured position inside the receptacle.

Aspect 11. The packaging of any one of aspects 1 to 10, wherein the packaging is configured to provide a first resistance against the movement of the actuator when the actuator is moved to insert the needle-like component into the mounting position.

Aspect 12. The packaging of aspect 11, wherein the first resistance is provided by a resilient element, optionally a spring element, further optionally by the resilient element of aspect 10.

Aspect 13. The packaging of aspect 12, wherein the packaging and/or the needle-like component is further configured to provide a second resistance against the movement of the actuator when the needle-like component is registered in the mounting position, and wherein the second resistance is larger than the first resistance, optionally wherein the actuator cannot be moved beyond a point when the needle-like component is registered in the mounting position.

Aspect 14. The packaging of aspect 13, wherein the second resistance is provided by a blocking element of the packaging and/or the needle-like component.

Aspect 15. The packaging of aspect 14, wherein the blocking element is a ferrule of the needle-like element or a prevention pin of the packaging or the MS system.

Aspect 16. The packaging of any one of aspects 1 to 15, wherein the packaging is further configured to engage with the needle-like component mounted to the MS system and retract the needle-like component into the secured position inside the receptacle.

Aspect 17. The packaging of any one of aspects 1 to 9, wherein the packaging includes a thread configured to allow turning of an outer part of the packaging with respect to an inner part of the packaging, wherein the inner part of the packaging is configured to keep the needle-like component in the secured position inside the receptacle.

Aspect 18. The packaging of aspect 17, wherein the packaging includes an additional coupling mechanism, wherein the additional coupling mechanism and the thread are configured to allow engaging with the needle-like component being mounted to the MS system and retracting the needle-like component into the secured position inside the receptacle.

Aspect 19. The packaging of any one of aspects 1 to 18, wherein the packaging is configured to transport and store the needle-like component.

Aspect 20. The packaging of any one of aspects 1 to 19, wherein the packaging is disposable.

Aspect 21. The packaging of any one of aspects 1 to 20, wherein the needle-like component is configured to be mounted to an ionization source (20) of the MS system, optionally wherein the ionization source is an electrospray ionization (ESI) source or an atmospheric pressure photoionization (APPI) source, wherein the needle-like component is an ESI capillary or sprayer needle or an APPI capillary.

Aspect 22. The packaging of any one of aspects 1 to 20, wherein the needle-like component is configured to be mounted to an ionization source of the MS system, wherein the ionization source is an atmospheric pressure chemical ionization (APCI) source, wherein the needle-like component is an APCI electrode.

Aspect 23. The packaging of any one of aspects 1 to 22, wherein the actuator is an electro-mechanically operated actuator.

Aspect 24. The packaging of aspects 21 and 23 or aspects 22 and 23, wherein the electro-mechanically operated actuator is configured to be controlled by a measurement signal, optionally wherein the measurement signal is based on an ionization current of the ionization source, wherein the ionization current is a function of a distance between the needle-like component and a counter plate of the ionization source.

Aspect 25. A method for mounting a needle-like component in a mass spectrometry (MS) system, the method comprising:

obtaining a packaging including the needle-like component in a secured position inside a receptacle of the packaging;

moving the needle-like component by activating an actuator of the packaging from the secured position inside the receptacle to a mounting position in which the needle-like component projects out of the receptacle to mount the needle-like component to the MS system.

Aspect 26. The method of aspect 25, wherein obtaining the needle-like component in the secured position includes keeping the needle-like component in the secured position inside the receptacle by a resilient element.

Aspect 27. The method of aspect 25 or 26, further comprising coupling the packaging with the MS system.

Aspect 28. The method of aspect 27, wherein coupling the packaging with the MS system includes coupling the packaging to a respective counterpart in the MS system.

Aspect 29. The method of aspect 27 or 28, wherein coupling the packaging with the MS system includes securing the packaging relative to the MS system.

Aspect 30. The method of aspect 29, wherein securing the packaging relative to the MS system includes aligning the needle-like component at a predefined angle with a tube of a housing of the needle-like component of the MS system.

Aspect 31. The method of any one of aspects 26 to 30, wherein moving the needle-like component includes pushing the needle-like component from the secured position inside the receptacle into the mounting position.

Aspect 32. The method of aspect 31, wherein pushing the needle-like component includes inserting the needle-like component into the MS system once the packaging is secured to the MS system.

Aspect 33. The method of any one of aspects 26 to 32, wherein moving the needle-like component includes controlling the actuator based on a measurement signal.

Aspect 34. The method of aspect 33, wherein the measurement signal is based on an ionization current of the ionization source of the MS system, wherein the ionization current is a function of a distance between the needle-like component and a counter plate of the ionization source.

Aspect 35. A method for removing a needle-like component from a mass spectrometry (MS) system, the method comprising:

engaging a packaging for the needle-like component with the needle-like component mounted to the MS system by activating an actuator of the packaging;

retracting the needle-like component from the mounting position into a secured position inside a receptacle of the packaging by activating the actuator of the packaging.

Aspect 36. The method of aspect 35, further comprising disposing the packaging including the needle-like component in the secured position inside the receptacle of the packaging.

Aspect 37. The method of any one of aspects 35 to 36, wherein retracting the needle-like component includes pulling the needle-like component into the secured position inside the receptacle.

Aspect 38. The method of any one of aspects 35 to 37, further comprising decoupling the packaging from the MS system.

Aspect 39. The method of aspect 38, wherein decoupling the packaging from the MS system includes decoupling the packaging from a respective counterpart in the MS system.

Aspect 40. The method of aspect 38 or 39, wherein decoupling the packaging from the MS system includes removing the packaging from a secured position relative to the MS system.

What is claimed is:

1. A packaging for a needle-like component of a mass spectrometry (MS) system, comprising:
a receptacle configured for storing the needle-like component in a secured position inside the receptacle;
an actuator configured to move the needle-like component from the secured position inside the receptacle to a mounting position in which the needle-like component projects out of the receptacle for mounting the needle-like component to the MS system,
wherein the actuator is configured to be detached from the needle-like component when the needle-like component is in the mounting position.

2. The packaging of claim 1, further comprising the needle-like component.

3. The packaging of claim 1, wherein the packaging further comprises a connector element configured to couple the packaging with the MS system.

4. The packaging of claim 3, wherein the connector element includes a fastening element.

5. The packaging of claim 4, wherein the fastening element is a thread, a pin, an interlock, a key, a shaped surface or another suitable fastening element to be coupled to a respective counterpart in the MS system to couple the packaging with the MS system.

6. The packaging of claim 3, wherein the connector element is configured to secure the packaging relative to the MS system.

7. The packaging of claim 6, wherein in a secured position of the packaging relative to the MS system the needle-like component is aligned at a predefined angle with a tube of a housing of the needle-like component of the MS system.

8. The packaging of claim 1, wherein the actuator is a pusher configured to push the needle-like component from the secured position inside the receptacle to the mounting position.

9. The packaging of claim 8, wherein once the packaging is secured to the MS system, the packaging is configured to facilitate inserting the needle-like component into the MS system by pushing the pusher to move the needle-like component to the mounting position.

10. The packaging of claim 1, wherein the packaging includes a resilient element configured to keep the needle-like component in the secured position inside the receptacle.

11. The packaging of claim 10, wherein the resilient element is a spring element.

12. The packaging of claim 1, wherein the packaging is configured to provide a first resistance against the movement of the actuator when the actuator is moved to insert the needle-like component into the mounting position.

13. The packaging of claim 12, wherein the first resistance is provided by a resilient element.

14. The packaging of claim 13, wherein the resilient element is a spring element.

15. The packaging of claim 12, wherein the packaging and/or the needle-like component is further configured to provide a second resistance against the movement of the actuator when the needle-like component is registered in the mounting position, and wherein the second resistance is larger than the first resistance.

16. The packaging of claim 15, wherein the actuator cannot be moved beyond a point when the needle-like component is registered in the mounting position.

17. The packaging of claim 15, wherein the second resistance is provided by a blocking element of the packaging and/or the needle-like component.

18. The packaging of claim 1, wherein the packaging is further configured to engage with the needle-like component mounted to the MS system and retract the needle-like component into the secured position inside the receptacle.

19. The packaging of claim 18, wherein the packaging is configured to transport and store the needle-like component.

20. The packaging of claim 1, wherein the packaging is disposable.

21. The packaging of claim 1, wherein the needle-like component is configured to be mounted to an ionization source of the MS system.

22. The packaging of claim 21, wherein the ionization source is an electrospray ionization (ESI) source or an atmospheric pressure photoionization (APPI) source.

23. The packaging of claim 21, wherein the needle-like component is an ESI capillary or sprayer needle or an APPI capillary.

24. A packaging for a needle-like component of a mass spectrometry (MS) system, comprising:

a receptacle configured for storing the needle-like component in a secured position inside the receptacle;

an actuator configured to move the needle-like component from the secured position inside the receptacle to a mounting position in which the needle-like component projects out of the receptacle for mounting the needle-like component to the MS system, wherein the actuator is an electro-mechanically operated actuator.

25. The packaging of claim 24, wherein the electro-mechanically operated actuator is configured to be controlled by a measurement signal.

26. The packaging of claim 24, wherein the measurement signal is based on an ionization current of the ionization source, wherein the ionization current is a function of a distance between the needle-like component and a counter plate of the ionization source.

27. A method for mounting a needle-like component in a mass spectrometry (MS) system, the method comprising:

obtaining a packaging including the needle-like component in a secured position inside a receptacle of the packaging; and moving the needle-like component by activating an actuator of the packaging from the secured position inside the receptacle to a mounting position in which the needle-like component projects out of the receptacle to mount the needle-like component to the MS system, and detaching the actuator from the needle-like component when the needle-like component is in the mounting position.

28. A method for removing a needle-like component from a mass spectrometry (MS) system, the method comprising:

engaging a packaging for the needle-like component, which is without the needle-like component, with the needle-like component mounted to the MS system by activating an actuator of the packaging; and retracting the needle-like component from the mounting position into a secured position inside a receptacle of the packaging by activating the actuator of the packaging.

* * * * *